(12) United States Patent
Matsui

(10) Patent No.: US 12,065,528 B2
(45) Date of Patent: Aug. 20, 2024

(54) PHOTOCURABLE COMPOSITION

(71) Applicant: THREEBOND CO., LTD., Tokyo (JP)

(72) Inventor: Chiaki Matsui, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 738 days.

(21) Appl. No.: 17/283,245

(22) PCT Filed: Oct. 11, 2019

(86) PCT No.: PCT/JP2019/040290
§ 371 (c)(1),
(2) Date: Apr. 6, 2021

(87) PCT Pub. No.: WO2020/080309
PCT Pub. Date: Apr. 23, 2020

(65) Prior Publication Data
US 2021/0347930 A1 Nov. 11, 2021

(30) Foreign Application Priority Data
Oct. 18, 2018 (JP) ................. 2018-196528

(51) Int. Cl.
*C08K 3/36* (2006.01)
*C08F 2/48* (2006.01)
*C08F 220/58* (2006.01)
*C08F 290/04* (2006.01)

(52) U.S. Cl.
CPC ........... *C08F 290/042* (2013.01); *C08F 2/48* (2013.01); *C08F 220/58* (2013.01); *C08K 3/36* (2013.01)

(58) Field of Classification Search
CPC ...... C08F 290/042; C08F 2/48; C08F 220/58; C08K 3/36; C09D 4/06; C09K 3/10
See application file for complete search history.

(56) References Cited

U.S. PATENT DOCUMENTS

| 2005/0095531 A1* | 5/2005 | Liu ............ C07D 335/16 |
| | | 430/270.1 |
| 2014/0243444 A1* | 8/2014 | Ikari ............ C08F 10/08 |
| | | 522/28 |
| 2018/0230256 A1 | 8/2018 | Yamamuro |

FOREIGN PATENT DOCUMENTS

| JP | 2013-216782 A | 10/2013 |
| JP | 2017-186439 A | 10/2017 |
| WO | 2013/047314 A1 | 4/2013 |
| WO | 2016/051915 A1 | 4/2016 |
| WO | 2016/152392 A1 | 9/2016 |

OTHER PUBLICATIONS

PCT, International Search Report for the corresponding patent application No. PCT/JP2019/040290, dated Dec. 24, 2019, with English translation.
PCT, Written Opinion of the International Searching Authority for the corresponding patent application No. PCT/JP2019/040290, dated Dec. 24, 2019 (English translation not available).
China National Intellectual Property Administration, Office Action dated Feb. 4, 2023 for the corresponding Chinese patent application No. 201980064904.1, with English translation (10 pages).
Office Action dated Jul. 4, 2023 for the corresponding Japanese Patent Application No. 2020-553163, with English translation.

* cited by examiner

*Primary Examiner* — Kumar R Bhushan
(74) *Attorney, Agent, or Firm* — LUCAS & MERCANTI, LLP

(57) ABSTRACT

Although it has been difficult to stabilize a viscosity and a thixo ratio in a composition containing a (meth)acrylate compound having a polyisobutylene skeleton, the present invention can stabilize the viscosity and the thixo ratio in a photocurable composition containing a (meth)acrylate compound having a polyisobutylene skeleton.
A photocurable composition including a component (A) and a component (B) such that the component (B) is contained in an amount of 0.1 to 15 parts by mass relative to 100 parts by mass of the component (A):
component (A): a (meth)acrylate compound having a polyisobutylene skeleton; and
component (B): a (meth)acrylamide compound.

8 Claims, No Drawings

PHOTOCURABLE COMPOSITION

CROSS REFERENCE TO RELATED APPLICATION

This Application is a 371 of PCT/JP2019/040290 filed on Oct. 11, 2019 which, in turn, claimed the priority of Japanese Patent Application No. 2018-196528 filed on Oct. 18, 2018, both applications are incorporated herein by reference.

TECHNICAL FIELD

The present invention relates to a photocurable composition containing a (meth)acrylate compound having a polyisobutylene skeleton.

BACKGROUND ART

WO 2013/047314 (corresponding to US 2014/243444 A) describes the invention of an active energy ray-curable composition characterized by containing a (meth)acryloyl-terminated polyisobutylene polymer and an active energy ray polymerization initiator. Oligomers having polyisobutylene in the skeleton have been used in various compositions regardless of non-reactivity and reactivity. However, due to a low polarity of polyisobutylene, other components compatible with the polyisobutylene are limited, and a viscosity as the composition and a thixo ratio representing a thixo property are not stable due to an influence of the compatibility. In an accelerated test (under a 60° C. atmosphere), the viscosity and the thixo ratio change significantly when the composition is left to stand.

SUMMARY OF INVENTION

Conventionally, it has been difficult to stabilize the viscosity and the thixo ratio in a composition containing a (meth)acrylate compound having a polyisobutylene skeleton.

Therefore, an object of the present invention is to provide a photocurable composition containing a (meth)acrylate compound having a polyisobutylene skeleton, which can stabilize a viscosity and a thixo ratio.

As a result of diligent studies to achieve the above object, the present inventors have found a method related to stabilization of the viscosity and the thixo ratio in the photocurable composition containing a (meth)acrylate compound having a polyisobutylene skeleton, and the present invention is completed accordingly.

The gist of the present invention will be described below. A first embodiment of the present invention is a photocurable composition containing a component (A) and a component (B) such that the component (B) is contained in an amount of 0.1 to 15 parts by mass relative to 100 parts by mass of the component (A):
component (A): a (meth)acrylate compound having a polyisobutylene skeleton; and
component (B): a (meth)acrylamide compound.

A second embodiment of the present invention is the photocurable composition according to the first embodiment, including as a component (C) a compound having a (meth)acryloyloxy group other than the component (A) and the component (B).

A third embodiment of the present invention is the photocurable composition according to the second embodiment, wherein the component (C) is a (meth)acrylate monomer containing no hydroxyl group.

A fourth embodiment of the present invention is the photocurable composition according to the second or third embodiment, including 50 to 80 parts by mass of the component (C) relative to 100 parts by mass of the component (A).

Fourth and fifth embodiments of the present invention are each the photocurable composition according to any one of the first to fourth embodiments, further including a polymer-type photoinitiator as a component (D).

A sixth embodiment of the present invention is the photocurable composition according to any one of the first to fifth embodiments, further including amorphous silica in which silanol remains on the surface as a component (E).

A seventh embodiment of the present invention is the photocurable composition according to any one of the first to sixth embodiments, wherein an initial thixo ratio (25° C.) and the thixo ratio (25° C.) after two weeks under a 60° C. atmosphere are both 4.0 or more.

An eighth embodiment of the present invention is a sealing agent containing the photocurable composition according to any one of the first to seventh embodiments.

A ninth embodiment of the present invention is the sealing agent according to the eighth embodiment for a cover seal of a hard disk drive.

A tenth embodiment of the present invention is a cured product obtained by curing the photocurable composition according to any one of the first to seventh embodiments by light irradiation.

DESCRIPTION OF EMBODIMENTS

A photocurable composition of the present invention contains a component (A): a (meth)acrylate compound having a polyisobutylene skeleton and a component (B): a (meth)acrylamide compound such that the component (B) is contained in an amount of 0.1 to 15 parts by mass relative to 100 parts by mass of the component (A). In the present invention having such a configuration, a viscosity and a thixo ratio can be stabilized in a photocurable composition containing the (meth)acrylate compound having a polyisobutylene skeleton.

Details of the present invention will be described below. The component (A) that can be used in the present invention is a (meth)acrylate compound having a polyisobutylene skeleton. The polyisobutylene skeleton refers to a block of a polymer as shown in the following general formula 1, and the skeleton is included as a block. Here, n indicates 2 or more. The component (A) includes a polyisobutylene skeleton and is therefore characterized by low moisture permeability. Although the component (A) may become a diblock or triblock copolymer with other blocks, a monoblock copolymer is most preferable. The component (A) contains two or more (meth)acryloyloxy groups in the compound and preferably has two (meth)acryloyloxy groups from the viewpoint of curability. A method of producing the component (A) is not limited, and the component (A) can be produced by the production methods described in JP 2013-35901 A, WO 2013/047314, WO 2017/099043, etc.

[Chemical Formula 1]

General formula 1

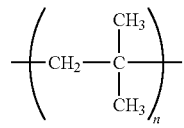

Specific examples of the component (A) include, but are not limited to, EP400V in EPION (registered trademark) series manufactured by Kaneka Corporation, and the like. A compound having both (meth)acrylate having a polyisobutylene skeleton of the component (A) and (meth)acrylamide of the component (B) is included in the component (A), and is not included in the component (B).

The component (B) that can be used in the present invention is a (meth)acrylamide compound, and contains 0.1 to 15 parts by mass of the component (B) relative to 100 parts by mass of the component (A). Here, a (meth)acrylamide compound and a (meth)acrylate compound are distinguished. Examples of the component (B) include, but are not limited to, dimethylacrylamide, acryloylmorpholine, diethylacrylamide, and the like. These compounds can be used alone or in combination of two or more. The (meth) acrylamide compound as the component (B) is preferably liquid at 25° C. and monofunctional from the viewpoint of workability.

Specific examples of the component (B) include DMAA (registered trademark), ACMO (registered trademark), DEAA (registered trademark), and the like manufactured by KJ Chemicals Corporation, and bifunctional acrylamide TM-1 and tetrafunctional acrylamide FAM-401 manufactured by FUJIFILM Corporation and the like are known, but are not limited thereto.

The component (B) is contained in an amount of 0.1 to 15 parts by mass relative to 100 parts by mass of the component (A). When the component (B) is contained in this range, an initial thixo ratio and the thixo ratio after an accelerated test can be maintained at 4.0 or more, and changes in viscosity and thixo ratio with time can be suppressed. The content of the component (B) is more preferably 0.1 to 10 parts by mass relative to 100 parts by mass of the component (A), and the content of the component (B) is most preferably 0.5 to 10 parts by mass relative to 100 parts by mass of the component (A).

Examples of the component (C) that can be used in the present invention include compounds having a (meth)acryloyloxy group other than the component (A) and the component (B). The component (C) is not limited as long as it is the compound having a (meth)acryloyloxy group other than the component (A) and the component (B), and one type or a combination of two or more types can be used. From the viewpoint of diluting the component (A), the component (C) is preferably a (meth)acrylate monomer. The component (C) is more preferably a (meth)acrylate monomer containing no hydroxyl group from the viewpoint of capable of improving compatibility with the component (A). Here, the (meth)acryloyloxy group is an expression that combines a methacryloyloxy group and an acryloyloxy group. The (meth)acrylate is an expression that combines methacrylate and acrylate. The compound having a (meth) acryloyloxy group corresponds to a superordinate concept of the (meth)acrylate compound and includes (meth)acrylic acid and the like in addition to the (meth)acrylate compound. The (meth)acrylate compound includes a monomer (low molecular weight compound) and further includes a dimer or more oligomer or polymer (preferably having a molecular weight of less than 1000).

The compound having a (meth)acryloyloxy group as the component (C) has 1 to 3 (meth)acryloyloxy groups. That is, this compound is a compound having monofunctional to trifunctional (meth)acryloyloxy groups. In addition, considering the dilution of the component (A), the molecular weight is preferably 1000 or less.

Specific examples of the compound having a monofunctional (meth)acryloyloxy group as the component (C) include, but not limited to, (meth)acrylate having a chain structure such as acrylic acid, methacrylic acid, lauryl (meth)acrylate, isooctyl (meth)acrylate, stearyl (meth)acrylate, and 2-ethylhexyl (meth)acrylate, ethylcarbitol (meth) acrylate, methoxydiethylene glycol (meth)acrylate, ethoxydiethylene glycol (meth)acrylate, butoxyethyl (meth) acrylate, butoxytriethylene glycol (meth)acrylate, 2-ethylhexyl polyethylene glycol (meth)acrylate, methoxydipropylene glycol (meth)acrylate, 2-hydroxyethyl (meth)acrylate, 2-hydroxypropyl (meth)acrylate, glycerol (meth)acrylate, polyethylene glycol (meth)acrylate, polypropylene glycol (meth)acrylate, ethylene oxide-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, and the like; (meth) acrylate having an alicyclic structure such as cyclohexyl (meth)acrylate, dicyclopentanyl (meth)acrylate, isobornyl (meth)acrylate, and the like; (meth)acrylate having an aromatic ring structure such as benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, nonylphenoxytetraethylene glycol (meth)acrylate, nonylphenyl polypropylene glycol (meth)acrylate, nonylphenol EO-modified (meth)acrylate (n≈1), ethylene oxide-modified phthalic acid (meth)acrylate, and the like; (meth)acrylate having a heterocyclic structure such as tetrahydrofurfuryl (meth)acrylate, caprolactone-modified tetrahydrofurfuryl (meth)acrylate, glycidyl (meth)acrylate, morpholinoethyl (meth)acrylate and the like; ethylene oxide-modified phosphoric acid (meth)acrylate; and the like.

Specific examples of the compound having a bifunctional (meth)acryloyloxy group as the component (C) include, but not limited to, (meth)acrylate having a chain structure such as 1,3-butylene glycol di(meth)acrylate, 1,4-butylene glycol di(meth)acrylate, neopentyl glycol di(meth)acrylate, 1,6-hexane glycol di(meth)acrylate, ethylene glycol di(meth) acrylate, polyethylene glycol di(meth)acrylate, propylene glycol di(meth)acrylate, tripropylene glycol di(meth)acrylate, ethireoxide-modified neopentyl glycol di(meth)acrylate, propylene oxide-modified neopentyl glycol di(meth) acrylate, hydroxypivalic acid ester neopentyl glycol di(meth)acrylate, caprolactone-modified hydroxypivalic acid ester neopentyl glycol di(meth)acrylate, neopentyl glycol-modified trimethylolpropane di(meth)acrylate, stearic acid-modified pentaerythritol di(meth)acrylate, and the like; (meth)acrylate having an alicyclic structure such as dimethylol tricyclodecane di(meth)acrylate, dicyclopentenyl di(meth)acrylate, ethylene oxide-modified dicyclopentenyl di(meth)acrylate, and the like; (meth)acrylate having an aromatic ring structure such as bisphenol A di(meth)acrylate, ethylene oxide-modified bisphenol A di(meth)acrylate, ethylene oxide-modified bisphenol S di(meth)acrylate, and the like; (meth)acrylate having a heterocyclic structure such as dimethacryloyl isocyanurate and the like; and the like.

Specific examples of the compound having a trifunctional (meth)acryloyloxy group as the component (C) include, but not limited to, (meth)acrylate having a chain structure such as trimethylolpropane tri(meth)acrylate, pentaerythritol tri (meth)acrylate, ethylene oxide-modified trimethylolpropane tri(meth)acrylate, propylene oxide-modified trimethylolpropane tri(meth)acrylate, and the like; (meth)acrylate having a heterocyclic structure such as tris(methacryloyloxyethyl) isocyanurate and the like; and the like.

The preferred component (C) in the present invention is a (meth)acrylate monomer having a chain structure containing no hydroxyl group, an alicyclic structure containing no hydroxyl group, or an aromatic structure containing no hydroxyl group. When no hydroxyl group is contained, the compatibility with the component (A) can be improved, and the composition can be prevented from separating during storage. Examples of those having a chain structure include isononyl acrylate, 2-ethylhexyl acrylate, isooctyl acrylate, and the like, examples of those having an alicyclic structure include isobornyl acrylate, dicyclopentanyl acrylicate, and the like, and examples of those having an aromatic ring structure include nonylphenol EO-modified acrylate (n≈1) and the like, but the present invention is not limited to these examples. Specific product names of the component (C) include INAA and IBXA manufactured by Osaka Organic Chemical Industry Ltd., SR440 (registered trademark) manufactured by Arkema Inc., 2-ethylhexyl acrylate manufactured by Mitsubishi Chemical Corporation, 2-ethylhexyl acrylate manufactured by Toagosei Co., Ltd., FANCRYL (registered trademark) FA-513AS manufactured by Hitachi Kasei Co., Ltd., ARONIX (registered trademark) M-111 manufactured by Toagosei Co., Ltd., etc., but the present invention is not limited to these examples.

In the photocurable composition of the present invention, it is most preferable that the compound having a (meth) acryloyloxy group of the component (C) contained in the composition includes only a (meth)acrylate monomer having a chain structure containing no hydroxyl group, an alicyclic structure containing no hydroxyl group, or an aromatic structure containing no hydroxyl group. In particular, it is most preferable that a high molecular weight (meth)acrylate oligomer or (meth)acrylate polymer having a molecular weight of 1000 or more is not contained from the viewpoint of compatibility with the component (A).

The component (C) is preferably contained in an amount of 40 to 90 parts by mass, more preferably 50 to 80 parts by mass relative to 100 parts by mass of the component (A). When the component (C) is contained in an amount of 40 parts by mass or more, optimum handleability is exhibited, and when the content is 90 parts by mass or less, good curability is maintained. In the photocurable composition, it is preferable that the component (B) be contained in an amount of 0.1 to 5 parts by mass relative to a total of 100 parts by mass of the component (B) and the component (C) from the viewpoint of capable of keeping the viscosity and the thixo ratio optimal.

Examples of the component (D) that can be used in the present invention include a photoinitiator. It suffices that the component (D) is decomposed to form radical species by irradiating with light, and the components (A) to (C) can be radically polymerized. Examples of the component (D) include dimethoxyacetophenone, 1-hydroxycyclohexylphenylketone, diethoxyacetophenone, acetophenone, propiophenone, benzophenone, xanthol, fluorene, benzaldehyde, anthraquinone, triphenylamine, 2,2-dimethoxy-1,2-diphenylethane-1-one, carbazole, 2-hydroxy-2-methylphenylpropane-1-one, 1-[4-(2-hydroxyethoxy)phenyl]-2-hydroxy-2-methyl-1-propane-1-one, 2-hydroxy-1-{4-[4-(2-hydroxy-2-methylpropionyl)benzyl]phenyl}-2-methylpropan-1-one, 2-benzyl-2-dimelamino-1-(4-morpholinophenyl)-1-butanone, bis(2,4,6-trimethylbenzoyl)phenylphosphine oxide, 2,4,6-trimethylbenzoyldiphenylphosphine oxide, 2-hydroxy-2-methyl-1-[4-(1-methylvinyl)phenyl]propanone oligomer, 3-methylacetophenone, 4-methylacetophenone, 3-pentylacetophenone, 4-methoxyacetophenone, 3-bromoacetophenone, p-diacetylbenzene, 3-methoxybenzophenone, 4-allylacetophenone, 4-methylbenzophenone, 4-chloro-4-benzylbenzophenone, 3-chloroxanthone, 3,9-dichloroxanthone, 3-chloro-8-nonylxantone, benzoyl, benzoinmethyl ether, benzoinbutyl ether, bis(4-dimethylaminophenyl)ketone, benzylmethoxyketal, 2-chlorotioxatone, and the like, and examples of the polymer type include a polymer (including oligomer) of 2-hydroxy-2-methyl-1-[4-(1-methylvinyl)phenyl]propane, and the like, but the present invention is not limited to these examples. These components can be used alone or in combination of two or more. The particularly preferred component (D) is a polymer-type photoinitiator that has an effect of reducing outgas generated from a cured product. The polymer-type photoinitiator repeatedly includes a basic structure and therefore may be a dimer or more, and although it can be said that there are a plurality of photoactive sites, a high molecular weight polymer (including oligomer) having a molecular weight of 300 or more is preferable. The upper limit of the molecular weight of this polymer-type photopolymerization initiator is not particularly limited, but is preferably 10,000 or less.

Specific examples of the component (D) include ESA-CURE (registered trademark) KIP-150 (oligo[2-hydroxy-2-methyl-1-[4-(1-methylvinyl)phenyl]propanone], molecular weight: 204.7×n (2≤n≤5)) manufactured by Lamberti, and the like, which is a polymer-type photoinitiator, but the present invention is not limited to these examples.

It is preferable that the component (D) be contained in an amount of 0.1 to 10 parts by mass relative to 100 parts by mass of the component (A). The content of the component (D) is more preferably 1.0 to 5.0 parts by mass. When the component (D) is contained in an amount of 0.1 parts by mass or more, optimum handleability is exhibited, and when the content is 10 parts by mass or less, curability is maintained.

Examples of the component (E) that can be used in the present invention include amorphous silica in which silanol remains on the surface. Amorphous silica refers to a hydrophilic silica powder with an average primary particle size of 1 to 100 nm and a specific surface area of 10 to 300 $m^2/g$ by a BET method. Although silanol remains on the surface of the amorphous silica after production, there is a compound in which a side chain is added to silanol by various surface treatments. In the present invention, amorphous silica in which silanol remains on the surface is suitable as the component (E). A surface treatment agent does not remain and become outgas, and the component (E) is combined with the components (A) to (C), so that these contribute to simultaneous achievement of a lower viscosity and a higher thixo ratio and stabilization.

Specific examples of the component (E) include AEROSIL (registered trademark) series OX50, 50, 90G, 130, 150, 200, 300, 380, and the like, manufactured by Nippon Aerosil Co., Ltd., but the present invention is not limited to these examples.

The component (E) is preferably contained in an amount of 1 to 30 parts by mass, more preferably 5 to 25 parts by mass relative to 100 parts by mass of the component (A). When the component (E) is contained in an amount of 1 part by mass or more, a high thixo ratio is maintained, and when the content is 30 parts by mass or less, the handleability is good.

The photocurable composition according to the present invention may contain an organic peroxide as long as the characteristics of the present invention are not impaired. As a result, a portion not exposed to light can be cured by heating. Specific examples of the organic peroxide include, but not limited to, ketone peroxides such as methylethylketone peroxide, cyclohexanone peroxide, 3,3,5-trimethylcyclohexanone peroxide, methylcyclohexanone peroxide, methyl acetoacetate peroxide, acetylacetone peroxide, and the like; peroxyketals such as 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy) valerate, 2,2-bis(t-butylperoxy)butane, and the like; hydroperoxides such as t-butyl hydroperoxide, cumene hydroperoxide, diisopropylbenzene hydroperoxide, p-menthane hydroperoxide, 2,5-dimethylhexane-2,5-dihydroperoxide, 1,1,3,3-tetramethylbutyl hydroperoxide, and the like; dialkyl peroxides such as di-t-butyl peroxide, t-butylcumyl peroxide, dicumyl peroxide, α,α'-bis(t-butylperoxy m-isopropyl) benzene, 2,5-dimethyl-2,5-di(t-butylperoxy)hexane, 2,5-dimethyl-2,5-di(t-butylperoxy)hexyne-3, and the like; diacyl peroxides such as acetyl peroxide, isobutyryl peroxide, octanoyl peroxide, decanoyl peroxide, lauroyl peroxide, 3,5,5-trimethyl hexanoyl peroxide, succinic acid peroxide, benzoyl peroxide, 2,4-dichlorobenzoyl peroxide, m-toluoyl peroxide, and the like; peroxydicarbonates such as diisopropyl peroxydicarbonate, di-2-ethylhexyl peroxydicarbonate, di-n-propyl peroxydicarbonate, bis-(4-t-butylcyclohexyl) peroxydicarbonate, dimyristyl peroxydicarbonate, di-2-ethoxyethyl peroxydicarbonate, dimethoxyisopropyl peroxydicarbonate, di(3-methyl-3-methoxybutyl) peroxydicarbonate, diallyl peroxydicarbonate, and the like; peroxyesters such as t-butyl peroxyacetate, t-butyl peroxyisobutylate, t-butyl peroxypivalate, t-butyl peroxyneodecanoate, cumyl peroxyneodecanoate, t-butylperoxy-2-ethylhexanoate, t-butylperoxy-3,5,5-trimethylhexanoate, t-butyl peroxylaurate, t-butyl peroxybenzoate, di-t-butyl peroxy isophthalate, 2,5-dimethyl-2,5-di(benzoylperoxy)hexane, t-butyl peroxymaleic acid, t-butyl peroxyisopropylcarbonate, cumyl peroxyoctoate, t-hexyl peroxyneodecanoate, t-hexyl peroxypivalate, t-butyl peroxyneohexanoate, t-hexyl peroxyneohexanoate, cumyl peroxyneohexanoate, and the like; acetyl cyclohexyl sulfonyl peroxide, t-butyl peroxyallylcarbonate; and the like.

The photocurable composition according to the present invention may contain a non-reactive plasticizer as long as the characteristics of the present invention are not impaired. A non-reactive compound is a compound that does not polymerize by reacting with the component (A), the component (B) and the component (C) of the present invention.

Specific examples of the non-reactive plasticizer include, but not limited to, aromatic polycarboxylic acid ester as a polycarboxylic acid ester-based plasticizer, dioctyl phthalate (DOP), dibutyl phthalate (DBP), diheptyl phthalate (DHP), diisononyl phthalate (DINP), diisodecyl phthalate (DIDP), butylbenzy phthalate (BBP), and the like as phthalic acid ester-based plasticizer; trioctyl trimellitic acid (TOTM), triisodecyl trimellitic acid (TITM), and the like as trimellitic acid ester-based plasticizers; tetraoctyl pyromellitic acid and the like as a pyromellitic acid ester-based plasticizer; di 2-ethylhexyl adipic acid (DOA), isodecyl adipic acid (DIDA), di 2-ethylhexyl sebacic acid (DOS), dibutyl sebacic acid (DBS), di 2-ethylhexyl maleic acid (DOM), dibutyl furmaric acid (DBF), di 2-ethylhexyl azellaic acid (DOZ), di 2-ethylhexyl epoxyhexahydrophthalic acid, trioctyl citric acid, glycerol triacetate, and the like as aliphatic polycarboxylic acid ester-based plasticizers; trimethyl phosphate, tributyl phosphate, tri-(2-ethylhexyl) phosphate, tributoxyethyl phosphate, triphenyl phosphate, tricresyl phosphate, alkyl aryl phosphate, triethyl phosphate, tris(chloroethyl) phosphate, trisdichloropropyl phosphate, tris(β-chloropropyl)phosphate, octyl diphenyl phosphate, tris(isopropylphenyl)phosphate, cresyl phenyl phosphate, and the like as phosphoric acid ester-based plasticizers; and the like. These may be used alone or in combination of two or more.

An elastomer can also be used as non-reactive plasticizer. Although any elastomer that is solid or liquid at 25° C. can be used, considering handleability, the elastomer is preferably liquid at 25° C. Examples of non-reactive elastomers include rubber-based elastomers such as polybutadiene, hydrogenated polybutadiene, polyisoprene, hydrogenated polybutadiene, polybutene, polyisobutylene, copolymers of these monomers, diblock polymers thereof, and triblock polymers thereof. Examples of the block polymer include, but are not limited to, a polystyrene-polyisobutylene diblock copolymer, a polystyrene-polyisobutylene-polystyrene triblock copolymer, and the like. The component is preferably compatible with the components (A) to (C). These may be used alone, or two or more kinds thereof may be used in combination.

The photocurable composition according to the present invention may contain components other than the above components (A) to (E) as long as the characteristics of the present invention are not impaired. Examples of the component include a colorant such as a pigment or a dye; an inorganic filler such as metal powder, calcium carbonate, talc, alumina, and aluminum hydroxide; an organic filler such as a polystyrene filler, a poly(meth)acrylic filler, and a rubber filler; a plasticizer; a flame retardant; an antioxidant; a polymerization inhibitor; a defoamer; a coupling agent; a leveling agent; a rheology control agent; and the like. By addition of these other components, a composition having excellent resin strength, bonding strength, workability, storage performance, or the like, and a cured product thereof can be obtained.

Examples of devices that cure the photocurable composition according to the present invention by light irradiation include, but are not limited to, an irradiation device having a high-pressure mercury lamp or LED that uses energy rays such as ultraviolet rays, visible light, and the like as a light source, a belt conveyor type irradiator, and a spot irradiator. An integrated light intensity is preferably 20 kJ/m$^2$ or more, and more preferably 30 kJ/m$^2$ or more.

In the photocurable composition of the present invention, the initial thixo ratio (25° C.) and the thixo ratio (25° C.) after two weeks under a 60° C. atmosphere are both 4.0 or more. Although 60° C. is the temperature in the accelerated test, the thixo ratio is more stable at 25° C. or lower which is a normal storage temperature. Thus, a control temperature is not limited to 60° C., and this case just refers to a case where the accelerated test has been performed at 60° C.

Applications of the photocurable composition of the present invention include a sealing agent containing the photocurable composition. The sealing agent of the present invention is a sealing agent having low moisture permeability and small compression set, and is highly productive because there is little change in viscosity and thixo ratio. In particular, the sealing agent can be suitably used for a cover seal of a hard disk drive. By strictly controlling the shape and dimension of the sealing agent of the hard disk drive, it is possible to prevent inert gas inside a housing from leaking to the external environment and invasion of moisture from the external environment. If there are variations in shape and dimension, leakage and invasion occur from the relevant portion.

Another embodiment of the present invention is a cured product obtained by curing the above-mentioned photocurable composition of the present invention by light irradiation. Such a cured product has low moisture permeability and small compression set. Thus, when the above-mentioned sealing agent is cured, it is excellent in that characteristics of the cured product can be effectively exhibited. A light irradiation device and the integrated light intensity used to obtain the cured product are as described above.

EXAMPLES

Next, the present invention will be described in more detail with reference to Examples, but the present invention is not limited to only these Examples (hereinafter, the photocurable composition is also simply referred to as a composition).

Examples 1 to 6 and Comparative Examples 1 to 6

The following components were provided to prepare compositions of Examples 1 to 6 and Comparative Examples 1 to 6.
Component (A): (Meth)acrylate compound having polyisobutylene skeleton
  Acrylate compound having polyisobutylene skeleton (EPION (registered trademark) EP400V manufactured by Kaneka Corporation)
Component (B): (Meth)acrylamide compound
  Dimethylacrylamide (DMAA (registered trademark) manufactured by KJ Chemicals Corporation)
  Acryloyl morpholine (ACMO (registered trademark) manufactured by KJ Chemicals Corporation)
Component (B'): Compound other than (B)
  Tetrahydrofurfuryl acrylate (Light Acrylate (registered trademark) THF-A manufactured by Kyoeisha Chemical Co., Ltd.)
Component (C): Compound having (meth)acryloyloxy group other than component (A) and the component (B)
  Isononyl acrylate (INAA manufactured by Osaka Organic Chemical Industry Ltd.)
  Nonylphenol EO-modified acrylate (n≈1) (ARONIX (registered trademark) M-111 manufactured by Toagosei Co., Ltd.)
  Isobornyl acrylate (IBXA manufactured by Osaka Organic Chemical Industry Ltd.)
  Dicyclopentanyl acrylicate (FANCRYL (registered trademark) FA-513AS manufactured by Hitachi Kasei Co., Ltd.)
  Isooctyl acrylate (SR440 (registered trademark) manufactured by Arkema Inc.)
Component (D): Photoinitiator
  Oligomer of 2-hydroxy-2-methyl-1-[4-(1-methylvinyl)phenyl]propane (ESACURE (registered trademark) KIP-150 manufactured by Lamberti)
Component (E): Amorphous silica in which silanol remains on surface
  Hydrophilic silica (AEROSIL (registered trademark) 130 manufactured by Nippon Aerosil Co., Ltd.) having average primary particle size of 16 nm and specific surface area (BET method) of 130 $m^2/g$.

Next, the components (A) to (E) and other components were weighed and put into a stirrer. Then, the mixture was stirred with a stirrer for 1 hour while being subjected to vacuum defoaming. The detailed preparation amounts follow Table 1, and all of the numerical values are represented by parts by mass. A total content of the component (B) (or component (B')) and the component (C) relative to 100 parts by mass of the component (A) and the content of the component (C) relative to 100 parts by mass of the component (A) are also described.

TABLE 1

| Component | Raw material | Example 1 | Example 2 | Example 3 | Example 4 | Example 5 | Example 6 |
|---|---|---|---|---|---|---|---|
| Component (A) | EP400V | 100 | 100 | 100 | 100 | 100 | 100 |
| Component (B) | DMAA | 1 | 1 | 8 | 1 | 1 | |
|  | ACMO | | | | | | 1 |
| Component (B') | THF-A | | | | | | |
| Component (C) | INAA | 33 | 66 | 58 | 48 | 33 | 33 |
|  | M-111 | | | | | 19 | 19 |
|  | IBXA | | | | 8 | | |
|  | FA-513AS | | | | 9 | | |
|  | SR440 | 33 | | | | 13 | 13 |
| Component (D) | KIP-150 | 3 | 3 | 3 | 3 | 3 | 3 |
| Component (E) | 130 | 11 | 11 | 11 | 12 | 12 | 12 |
| Total | | 181.0 | 181.0 | 180.0 | 181.0 | 181.0 | 181.0 |
| Total content of component (B) (or component (B')) and component (C) relative to 100 parts by mass of component (A) | | 67.0 | 67.0 | 66.0 | 66.0 | 66.0 | 66.0 |
| Content of component (C) relative to 100 parts by mass of component (A) | | 66.0 | 66.0 | 58.0 | 65.0 | 65.0 | 65.0 |

| Component | Raw material | Comparative Example 1 | Comparative Example 2 | Comparative Example 3 | Comparative Example 4 | Comparative Example 5 | Comparative Example 6 |
|---|---|---|---|---|---|---|---|
| Component (A) | EP400V | 100 | 100 | 100 | 100 | 100 | 100 |
| Component (B) | DMAA | | 17 | | | | |
|  | ACMO | | | | | | |
| Component (B') | THF-A | | | | | | 1 |
| Component (C) | INAA | 67 | 50 | 48 | 33 | 48 | 33 |
|  | M-111 | | | | 20 | 36 | 19 |
|  | IBXA | | | 8 | | | |
|  | FA-513AS | | | 10 | | | |
|  | SR440 | | | | 13 | 16 | 13 |

TABLE 1-continued

| | | | | | | | |
|---|---|---|---|---|---|---|---|
| Component (D) | KIP-150 | 2.5 | 2.5 | 2.5 | 2.5 | 3.0 | 2.5 |
| Component (E) | 130 | 11 | 11 | 12 | 12 | 14 | 12 |
| Total | | 180.5 | 180.5 | 180.5 | 180.5 | 217.0 | 180.5 |
| Total content of component (B) (or component (B')) and component (C) relative to 100 parts by mass of component (A) | | 67.0 | 67.0 | 66.0 | 66.0 | 100.0 | 66.0 |
| Content of component (C) relative to 100 parts by mass of component (A) | | 67.0 | 50.0 | 66.0 | 66.0 | 100.0 | 65.0 |

Appearance (before curing) confirmation, thick film curability confirmation, viscosity and thixo ratio measurement, accelerated test, compression permanent strain measurement, and moisture permeability measurement (humidity sensor method) were performed on the compositions of Examples 1 to 6 and Comparative Examples 1 to 6, and the results are summarized in Table 2.

[Appearance (Before Curing) Confirmation]

10 g of the composition was collected in a test tube and left at an atmospheric temperature of 25° C. for 3 days. The presence or absence of cloudiness of the composition was visually confirmed and defined as "appearance (before curing)". Although "transparency" is good, even if "slight cloudiness" is confirmed, there is no problem as long as the thick film curability is 3 mm or more.

[Thick Film Curability Confirmation]

The composition was placed in a polypropylene cylindrical container having an inner diameter of 10 mm to a depth of 10 mm. A belt conveyor type ultraviolet irradiator was used to apply an integrated light intensity of 60 kJ/m² from an opening to cure the composition. The cured product was taken out from the cylindrical container, an uncured portion was wiped off, and a thickness of the cured product was measured with a caliper to obtain "thick film curability (mm)". Considering deep curability, the thick film curability is preferably 3 mm or more.

[Viscosity and Thixo Ratio Measurement]

The viscosity and the thixo ratio were measured with a rheometer according to the following specifications. HAAKE MARS III manufactured by Thermo Fisher Scientific K.K. was used. The viscosity was defined as a viscosity 1 when a shear rate was 20 s$^{-1}$ and was defined as a viscosity 2 when the shear rate was 2 s$^{-1}$. A numerical value of the viscosity 1 was defined as "viscosity (Pa·s)", and a numerical value of the viscosity 2/the viscosity 1 was defined as "thixo ratio".

Measurement Specifications

Atmospheric temperature at the time of measurement: 25° C.

Cone: C35/2 (angle 2°).

[Accelerated Test]

For the composition, the viscosity and the thixo ratio were measured by the above-mentioned "viscosity and thixo ratio measurement". The result was defined as "initial stage". Then, the composition was left in a hot air drying oven under a 60° C. atmosphere for 14 days, and then taken out from the hot air drying oven. After returning to room temperature, the viscosity and the thixo ratio were measured again by the above-mentioned "viscosity and thixo ratio measurement". The result was defined as "after accelerated test". "Rate of change (%)"=("After accelerated test"−"Initial stage")/"Initial stage"×100 to give "Rate of change (%)" of the viscosity and the thixo ratio. The rate of change in viscosity is preferably −20% to 50%, and more preferably −20% to 30%. Both the initial thixo ratio and the thixo ratio after the accelerated test are preferably 4.0 or more, and the rate of change in thixo ratio is preferably −30% to 30%. As a result, the composition can be applied without causing variations in shape and dimension.

[Compression Permanent Strain Measurement]

On an aluminum plate having a thickness of 1 mm, the composition was applied in a beat shape in a width of 1 mm×a height (thickness) of 1 mm. A belt conveyor type ultraviolet irradiator was used to apply an integrated light intensity of 60 kJ/m² to cure the composition, and thus to form a beat. At this point, a "beat thickness (mm)" was measured. After that, the beat was crushed at a compression ratio of 45% in a height direction with a block processed with polytetrafluoroethylene and fixed ("clearance (mm) during compression" which was the height of the beat at this point was "0.55 mm"). Then, without compression, the beat was left under a 60° C. atmosphere for 72 hours, and then after returning to room temperature, the height of the beat ("beet thickness (mm) after compression") was measured. The following mathematical formula 2 was defined as "compression permanent strain (%)". In order to maintain a sealing property in the present invention, the compression permanent strain is preferably 30% or less, and more preferably 15% or less The compression ratio was calculated by the following mathematical formula 3.

[Mathematical formula 1]

$$\text{Compression permanent strain}(\%) = \frac{\text{Thickness of beat(mm)} - \text{thickness of beat(mm) after compression}}{\text{Thickness of beat(mm)} - \text{clearance (mm) during compression}} \times 100$$

Mathematical formula 2

$$\text{Compression ratio}(\%) = \frac{\text{Thickness of beat(mm)} - \text{clearance (mm) during compression}}{\text{Thickness of beat(mm)} \times 100} \times 100$$

Mathematical formula 3

[Moisture Permeability Measurement (Humidity Sensor Method)]

The measurement was performed by the humidity sensor method. The composition was poured into a frame of 100 mm in length×100 mm in width×0.25 mm in height so as not to mix bubbles. After that, a belt conveyor type ultraviolet irradiator was used to apply an integrated light intensity of 60 kJ/m² to produce a sheet-shaped cured product. L80-5000 manufactured by Lyssy was measured in an atmosphere of 40° C.×90% RH using a water vapor permeability measuring machine. The result was defined as "moisture permeability (g/m²·24 h)". The detailed test method complies with JIS K 7129: 2008. In the present invention, 20 g/m²·24 h or less is suitable.

TABLE 2

| Test items | | Example 1 | Example 2 | Example 3 | Example 4 | Example 5 | Example 6 |
|---|---|---|---|---|---|---|---|
| Appearance (before curing) | | Slight cloudiness | Slight cloudiness | Slight cloudiness | Transparency | Slight cloudiness | Slight cloudiness |
| Thick film curability (mm) | | 1 or more | 7 or more | 7 or more | 7 or more | 7 or more | 7 or more |
| Viscosity (Pa · s) | Initial stage | 37 | 37 | 27 | 88 | 80 | 73 |
| | After accelerated test | 37 | 40 | 34 | 81 | 68 | 69 |
| | Rate of change (%) | 0 | 8 | 26 | −8 | −15 | −5 |
| Thixo ratio | Initial stage | 6.2 | 6.1 | 4.7 | 5.8 | 6.1 | 5.9 |
| | After accelerated test | 4.7 | 4.7 | 4.1 | 5.0 | 5.0 | 4.9 |
| | Rate of change (%) | −24 | −24 | −13 | −14 | −18 | −17 |
| Compression permanent strain (%) | | 12 | 12 | 14 | 14 | 8 | 8 |
| Moisture permeability (g/m$^2$ · 24 h) | | 12 | 12 | 17 | 14 | 13 | 13 |

| Test items | | Comparative Example 1 | Comparative Example 2 | Comparative Example 3 | Comparative Example 4 | Comparative Example 5 | Comparative Example 6 |
|---|---|---|---|---|---|---|---|
| Appearance (before curing) | | Slight cloudiness | Slight cloudiness | Transparency | Slight cloudiness | Slight cloudiness | Slight cloudiness |
| Thick film curability (mm) | | 7 or more | 7 or more | 7 or more | 7 or more | 7 or more | 7 or more |
| Viscosity (Pa · s) | Initial stage | 28 | 36 | 62 | 63 | 44 | 72 |
| | After accelerated test | 28 | 43 | 66 | 49 | 30 | 50 |
| | Rate of change (%) | −1 | 20 | 6 | −22 | −33 | −31 |
| Thixo ratio | Initial stage | 6.0 | 3.2 | 4.6 | 6.1 | 7.7 | 6.3 |
| | After accelerated test | 3.6 | 3.1 | 3.7 | 3.5 | 2.8 | 4.0 |
| | Rate of change (%) | −40 | −3 | −20 | −43 | −64 | −37 |
| Compression permanent strain (%) | | 14 | 17 | 18 | 12 | 19 | 13 |
| Moisture permeability (g/m$^2$ · 24 h) | | 11 | 22 | 14 | 13 | 21 | 13 |

It is considered that the appearance (before curing) becomes untransparent if the compatibility with the component (A) is not good due to the polarity of the component (B) or the component (B') and the component (C). However, regardless of the state of the appearance, it can be seen that the thick film curability is 7 mm or more in Examples and Comparative Examples, and the curability is good. Although the rates of change in viscosity and thixo ratio in the initial stage and after the accelerated test are confirmed, the change is low in Examples 1 to 6, and the thixo ratio exceeds 4.0 even in the initial stage and after the accelerated test, indicating that a thixo property is maintained. On the other hand, in Comparative Examples 1 and 3 to 6, even if the initial thixo ratio exceeds 4.0, the thixo ratio falls below 4.0 after the accelerated test, or the rate of change does not fall within −30% to 30%. In Comparative Example 2, although the component (B) is contained, the thixo ratio is low in the initial stage.

INDUSTRIAL APPLICABILITY

The sealing agent using the photocurable composition of the present invention has good workability due to its excellent viscosity and stability of the thixo ratio, and the sealing agent can be efficiently formed. The sealing agent has low moisture permeability and good resilience and is therefore useful as a sealing agent for other electrical and electronic parts such as a cover seal for sealing a housing of a hard disk drive.

The invention claimed is:

1. A photocurable composition comprising a component (A), a component (B), and a component (C), wherein the component (B) is contained in an amount of 0.1 to 15 parts by mass relative to 100 parts by mass of the component (A), and the component (C) is contained in an amount of 50 to 80 parts by mass relative to 100 parts by mass of the component (A):
   component (A): a (meth) acrylate compound having a polyisobutylene skeleton;
   component (B): a (meth) acrylamide compound; and
   component (C): a compound having a (meth) acryloyloxy group other than the component (A) and the component (B).

2. The photocurable composition according to claim 1, wherein the component (C) is a (meth) acrylate monomer containing no hydroxyl group.

3. The photocurable composition according to claim 1, further comprising a polymer-type photoinitiator as a component (D).

4. The photocurable composition according to claim 1, further comprising amorphous silica in which silanol remains on the surface as a component (E).

5. The photocurable composition according to claim 1, wherein an initial thixo ratio (25° C.) and a thixo ratio (25° C.) after two weeks under a 60° C. atmosphere are both 4.0 or more.

6. A sealing agent comprising the photocurable composition according to claim 1.

7. The sealing agent according to claim 6, for a cover seal of a hard disk drive.

8. A cured product obtained by curing the photocurable composition according to claim 1 by light irradiation.

* * * * *